UNITED STATES PATENT OFFICE.

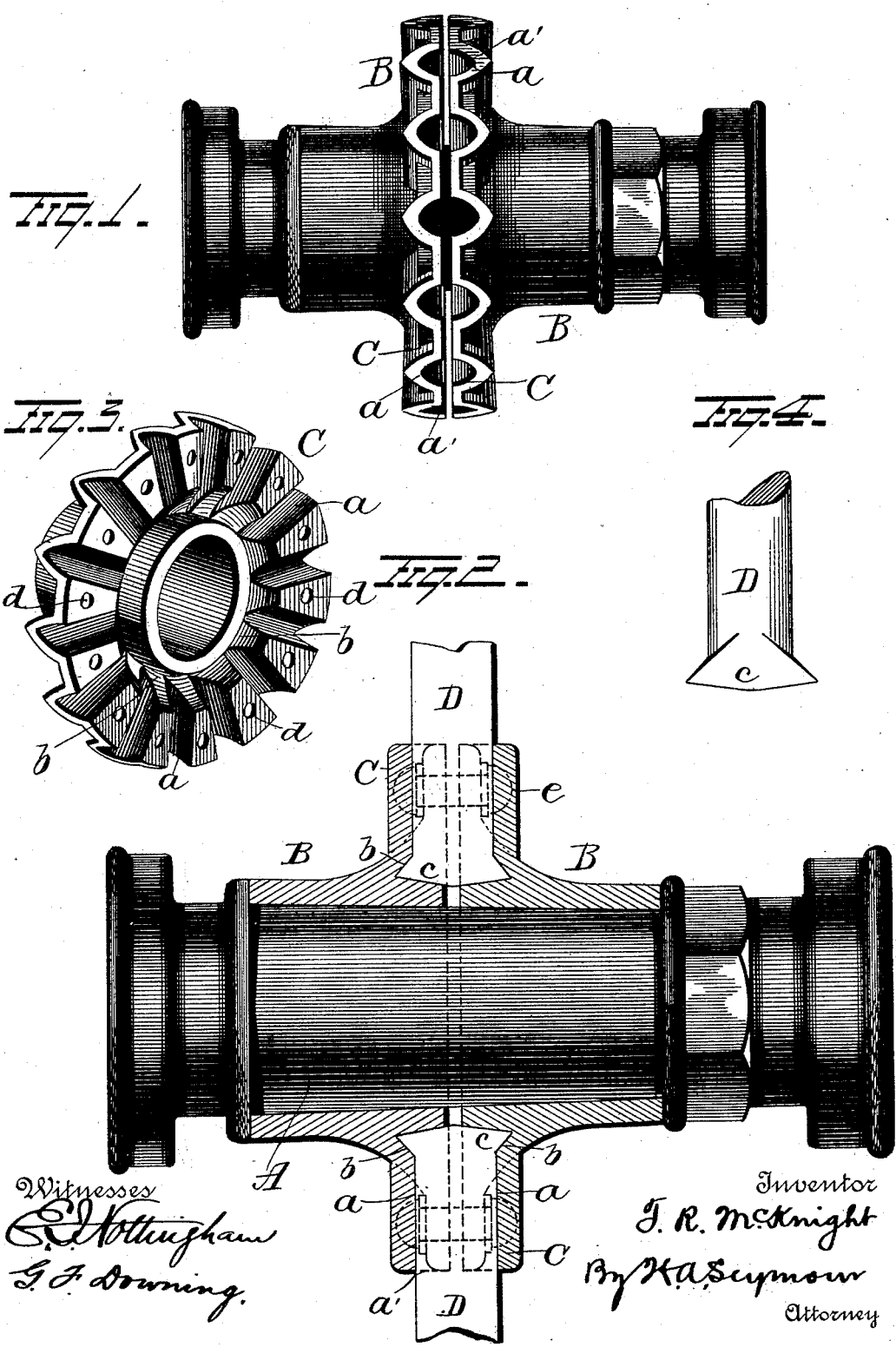

THOMAS R. McKNIGHT, OF AURORA, ILLINOIS.

WHEEL.

SPECIFICATION forming part of Letters Patent No. 491,662, dated February 14, 1893.

Application filed July 8, 1892. Serial No. 439,378. (No model.)

*To all whom it may concern:*

Be it known that I, THOMAS R. MCKNIGHT, a resident of Aurora, in the county of Kane and State of Illinois, have invented certain new and useful Improvements in Wheels; and I do hereby declare the following to be a full, clear, and exact description of the invention, such as will enable others skilled in the art to which it appertains to make and use the same.

My invention relates to an improvement in wheels,—the object being to produce a malleable hub for a steel wheel which shall be simple in construction and which shall be easy to put together.

A further object is to produce a metallic hub and spokes so constructed and arranged that when the spokes are placed in position and the parts of the hub secured together, said spokes will be securely held in place and their escape effectually prevented.

With these objects in view the invention consists in certain novel features of construction and combinations and arrangements of parts as hereinafter set forth and pointed out in the claims.

In the accompanying drawings: Figure 1 is a side elevation illustrating my improved hub. Fig. 2 is a sectional view showing the spokes inserted in place. Fig. 3 is a view illustrating one of the parts of the hub. Fig. 4 is a view of one of the spokes.

A represents an axle box which may be made removable or it may be made integral with one portion of the hub B. The hub B is made in two parts, each having a lateral annular flange C, said hub and flanges being preferably made of malleable iron. The annular flange C of each part or section of the hub is made, throughout its extent, with substantially U-shaped recesses $a$, which, when the two parts of the hub are placed together constitute a number of oval sockets $a'$ as shown in Fig. 1, said sockets conforming to the shape of the spokes D inserted therein.

The flanges C are removed somewhat from the inner ends of the sections of the hub and at the juncture of said flanges and the sections of the hub, annular grooves or recesses $b$ are made to receive the enlargements $c$ of the head of the spokes D. Between the recessed portions $a$ of the flanges C, said flanges are provided with perforations $d$ for the accommodation of bolts $e$ which serve to unite the two parts of the hub with the spokes D firmly clamped between them. From this construction and arrangement it will be seen that each flange C is provided with seats for the spokes, that the enlarged heads of the spokes enter grooves in the hub and bear on the inner ends of the hub sections and that when the parts or sections of the hub are joined together by means of bolts or rivets passing through the flanges C between the spokes, said spokes will be firmly and securely held in place. When the parts of the hub are thus united with the spokes locked between them, said flanges are intended to stand apart sufficiently to admit of variation of spokes, the heads of said spokes entering the grooves or recesses $b$ in the two parts of the hub.

A wheel thus constructed is very simple in construction, the spokes will be held firmly in place, the parts may be easily and quickly secured together and when completed will produce a wheel efficient in every respect in the performance of its functions.

Having fully described my invention what I claim as new and desire to secure by Letters Patent is:

1. The combination with axle box, of a hub made in two sections, mounted on the hub box, said sections having flanges in which sockets are formed for spokes, each section provided with an annular recess adapted to receive enlargements formed on the spokes, substantially as set forth.

2. The combination with a hub box, of a hub composed of two sections, mounted on the hub box, each section of the hub provided with an annular flange, and the flanges having U-shaped recesses formed therein to receive the spokes, said flanges each having an annular recess at its lower end adapted to receive enlargements on the spokes, substantially as set forth.

3. The combination with axle box, of a hub made in sections, each section provided with a flange and having an annular undercut recess formed at the point where the flange joins the body of the section, each flange having radial half sockets which lead to the annular recess, substantially as set forth.

In testimony whereof I have signed this specification in the presence of two subscribing witnesses.

T. R. McKNIGHT.

Witnesses:
LOUIS G. ALSHULER,
J. C. JOHNSON.